United States Patent
Costabello et al.

(10) Patent No.: US 12,051,010 B2
(45) Date of Patent: Jul. 30, 2024

(54) SYSTEM TO PREDICT SURPRISING LINKS IN KNOWLEDGE GRAPHS

(71) Applicant: Accenture Global Solutions Limited, Dublin (IE)

(72) Inventors: Luca Costabello, Newbridge (IE); Mykhaylo Zayats, Dublin (IE); Jeremiah Hayes, Dublin (IE)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 1209 days.

(21) Appl. No.: 16/560,499

(22) Filed: Sep. 4, 2019

(65) Prior Publication Data

US 2020/0356874 A1 Nov. 12, 2020

Related U.S. Application Data

(60) Provisional application No. 62/846,043, filed on May 10, 2019.

(51) Int. Cl.
*G06N 5/04* (2023.01)
*G06N 5/02* (2023.01)
*G06N 20/00* (2019.01)

(52) U.S. Cl.
CPC ............... *G06N 5/04* (2013.01); *G06N 5/02* (2013.01); *G06N 20/00* (2019.01)

(58) Field of Classification Search
CPC ............ G06N 5/04; G06N 20/00; G06N 5/02; G06N 3/04
See application file for complete search history.

(56) References Cited

U.S. PATENT DOCUMENTS

2019/0122111 A1* 4/2019 Min .................. G06N 3/045
2019/0347358 A1* 11/2019 Mishra .................. G06F 3/167

OTHER PUBLICATIONS

Wang, et al., Display Advertising with Real-Time Bidding (RTB) and Behavioural Targeting, arXiv:1610.03013v1 [cs.GT], 2016, pp. 1-119 (Year: 2016).*
Qader, The Computer Network Faults Classification Using a Novel Hybrid Classifier, Doctoral Thesis, University of Portsmouth, 2019, pp. 1-168 (Year: 2019).*
Puigcerver, A Probabilistic Formulation of Keyword Spotting, Doctoral Thesis, Polytechnic University of Valencia, 2018, pp. 1-308 (Year: 2018).*

* cited by examiner

*Primary Examiner* — Li Wu Chang (57) ABSTRACT

Complex computer system architectures are described for analyzing data elements of a knowledge graph, and predicting new surprising or unforeseen facts from relational learning applied to the knowledge graph. This discovery process takes advantage of the knowledge graph structure to improve the computing capabilities of a device executing a discovery calculation by applying both training and inference analysis techniques on the knowledge graph within an embedding space, and generating a scoring strategy for predicting surprising facts that may be discoverable from the knowledge graph.

15 Claims, 6 Drawing Sheets

SYSTEM TO PREDICT SURPRISING LINKS IN KNOWLEDGE GRAPHS

CROSS-REFERENCE TO RELATED APPLICATION(S)

This application claims benefit to U.S. Provisional Patent Application No. 62/846,043, filed May 10, 2019, the entirety of which is hereby incorporated by reference herein.

TECHNICAL FIELD

Complex computer system architectures are described for analyzing data elements of a knowledge graph, and predicting new surprising or unforeseen facts from relational learning applied to the knowledge graph. This discovery process takes advantage of the knowledge graph structure to improve the computing capabilities of a device executing a discovery calculation by applying both training and inference analysis techniques on the knowledge graph within an embedding space, and generating a scoring strategy for predicting surprising facts that may be discoverable from the knowledge graph. The discovery of surprising facts may be applied to models for artificial intelligence (AI) applications.

BACKGROUND

Data stored in a knowledge graph format is presented to reflect relations between specific concepts within the knowledge graph. Even so traditional approaches for discovering information from a knowledge graph have not considered solutions for discovering new facts that do not have an existing relationship within the knowledge graph.

DETAILED DESCRIPTION

According to some embodiments, a computing device is disclosed that comprises a reception circuitry configured to receive a knowledge graph including a set of structured data, a knowledge graph embedding circuitry configured to convert the knowledge graph to an embeddings space, wherein the embeddings space includes a set of point coordinates representing the set of structured data in the embeddings space, a training circuitry configured to train the embeddings space; an inference circuitry configured to apply inference analysis on a set of candidate facts; and a processing circuitry. The processing circuitry may be configured to calculate a respective overall surprise score for each of a plurality of candidate facts included in the set of candidate facts, and select a candidate fact from the plurality of candidate facts as a surprising fact based on an overall surprise score of the candidate fact.

According to some embodiments, a method is disclosed comprising receiving, by a reception circuitry, a knowledge graph including a set of structured data, converting, by a knowledge graph embedding circuitry, the knowledge graph to an embeddings space, wherein the embeddings space includes a set of point coordinates representing the set of structured data in the embeddings space, training, by a training circuitry, the embeddings space, applying, by an inference circuitry, inference analysis on a set of candidate facts obtained from the trained embeddings space, calculating, by a processing circuitry, a respective overall surprise score for each of a plurality of candidate facts included in the set of candidate facts, and selecting, by the processing circuitry, a candidate fact from the plurality of candidate facts as a surprising fact based on an overall surprise score of the candidate fact.

According to some embodiments a computing device is disclosed comprising a processing circuitry, and a non-transitory storage medium configured to store instructions that, when executed, causes the processing circuitry to: receive a knowledge graph including a set of structured data, convert the knowledge graph to an embeddings space, wherein the embeddings space includes a set of point coordinates representing the set of structured data in the embeddings space, train the embeddings space, apply inference analysis on a set of candidate facts obtained from the trained embeddings space, calculate a respective overall surprise score for each of a plurality of candidate facts included in the set of candidate facts, and select a candidate fact from the plurality of candidate facts as a surprising fact based on an overall surprise score of the candidate fact.

To take advantage of the benefits offered by big data technologies, enterprise systems have access to large, and rapidly growing, volumes of information, both proprietary and public. Existing analytical applications and data warehousing systems have not been able to fully utilize this profound access to information. Oftentimes information is simply aggregated into large data lakes or data warehouses without the inclusion of an added layer of relationship data connecting the information. Such aggregation of large amounts of data without contextual or relational information are data dumps that are not particularly useful. Information stored in data lakes and data warehouses are likely to be stored in their original format, thus expending large amounts of computing resources to extract, transform, and load (ETL) the information into a searchable data set to respond to a data query.

Generally, a knowledge graph includes a knowledge base of relevant information structured in a graph presentation that captures entities (i.e., nodes), relationships (i.e., edges), and attributes (i.e., node properties or edge properties) with semantic meaning. This graph type of data structure model offered by the knowledge graph provides semantic meaning of the included data, by modeling data with an ontology or taxonomy. Accordingly, technical improvements are realized when a computing device structures information into knowledge graphs and runs search queries on the knowledge graphs, which specifically result in the retrieval of more relevant and accurate information, in a shorter amount of time.

Accordingly, a knowledge graph is disclosed that offers an innovative data structure for presenting relevant information, as well as depicting relationships between the relevant information. To further take advantage of the unique characteristics of a knowledge graph, this disclosure also describes technical strategies for predicting new and surprising facts that are derived from the existing information in the knowledge graph. Discovering these new surprising facts may be inferred from the information presented by the knowledge graph, and may not have otherwise been predicted according to other information discovery strategies previously applied to a knowledge graph.

Existing prediction feedback models have not accounted for the notion of surprise when generating their predictions. So the resulting predictions from existing models are mostly generic and not "surprising" in view of what is possible. However, there are situations where surprising predictions are desired. Creating realistic AI models is at least one such area where predicting new surprising facts is desired to mimic human spontaneity. Fields that deal with formulations (e.g., medicine or food recipes) is another field where discovering new and surprising facts may be desirable to create new combinations in formulations.

It follows that the feedback models described herein utilize relational learning techniques to predict and discover new surprising facts from the data stored in the knowledge graphs. By utilizing the knowledge graph and relational learning techniques, the described models provide technical strategies for analyzing data that are more efficient and conserve on the finite resources available to an enterprise applying, for example, artificial intelligence (AI) and machine learning (ML) models. It should be noted that the features described herein are applicable to knowledge graphs of data across various fields of technology or interest.

Figure 1:
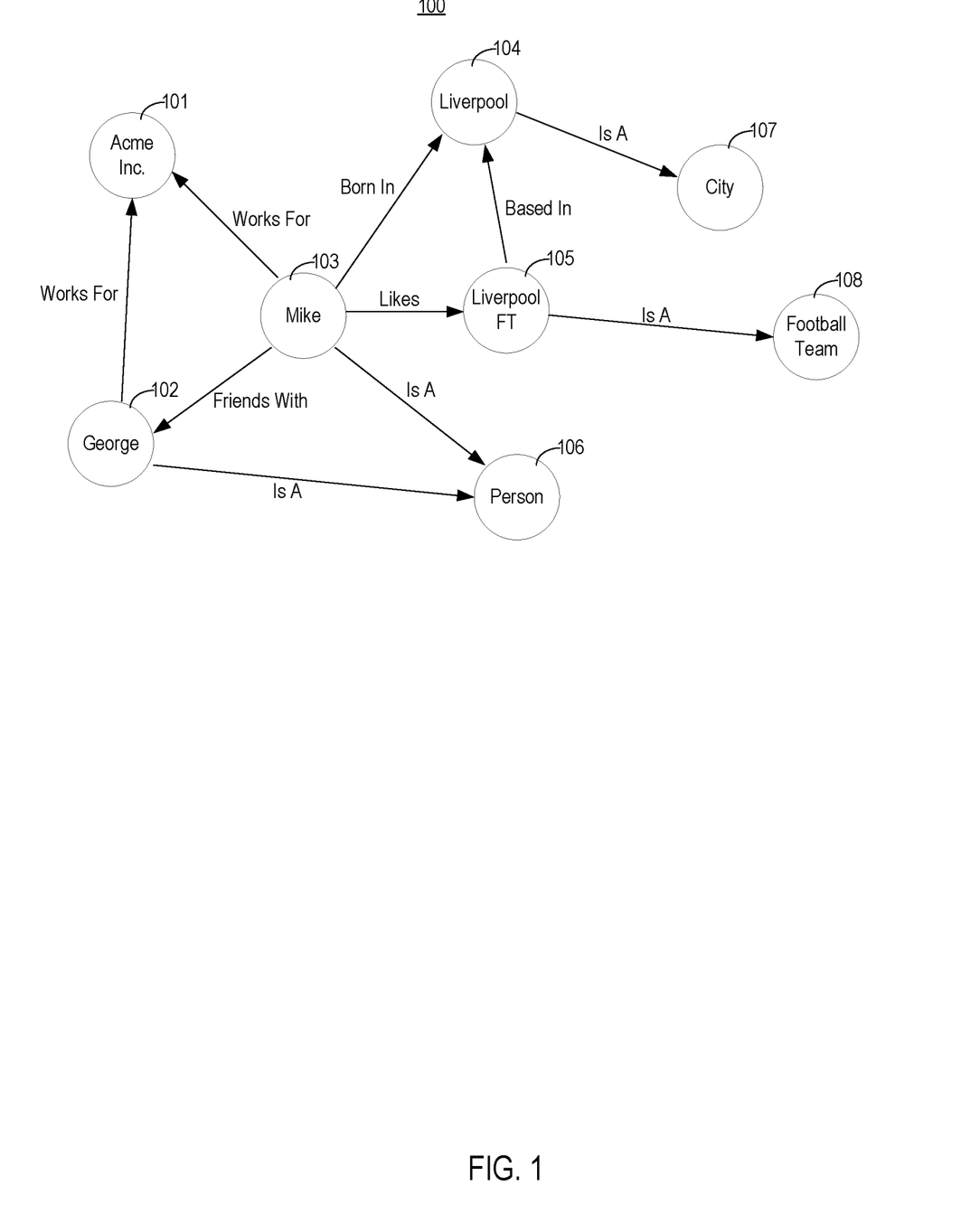
FIG. 1 shows an exemplary knowledge graph, according to some embodiments.

To begin, FIG. 1 shows an exemplary knowledge graph (KG) 100, which may represent a whole knowledge graph or at least a portion of a larger overall knowledge graph according to some embodiments. The KG 100 includes nodes 101-108, and edges in-between that connect the nodes 101-108. Each of the nodes 101-108 represent a concept, while the edges between the nodes 101-108 describes a relationship between the connected nodes 101-108. The KG 100 may be interpreted as a collection of facts represented by specific data triples. Each triple is an atomic unit of knowledge for the KG 100 that includes three data points that are connected on the KG 100. A triple may take the form of {subject, predicate, object}. An exemplary triple from the KG 100 includes: {Mike, likes, Liverpool FT}, {Liverpool FT, Is A, Football team}, {George, Works For, Acme Inc.}, and so on.

Figure 2:
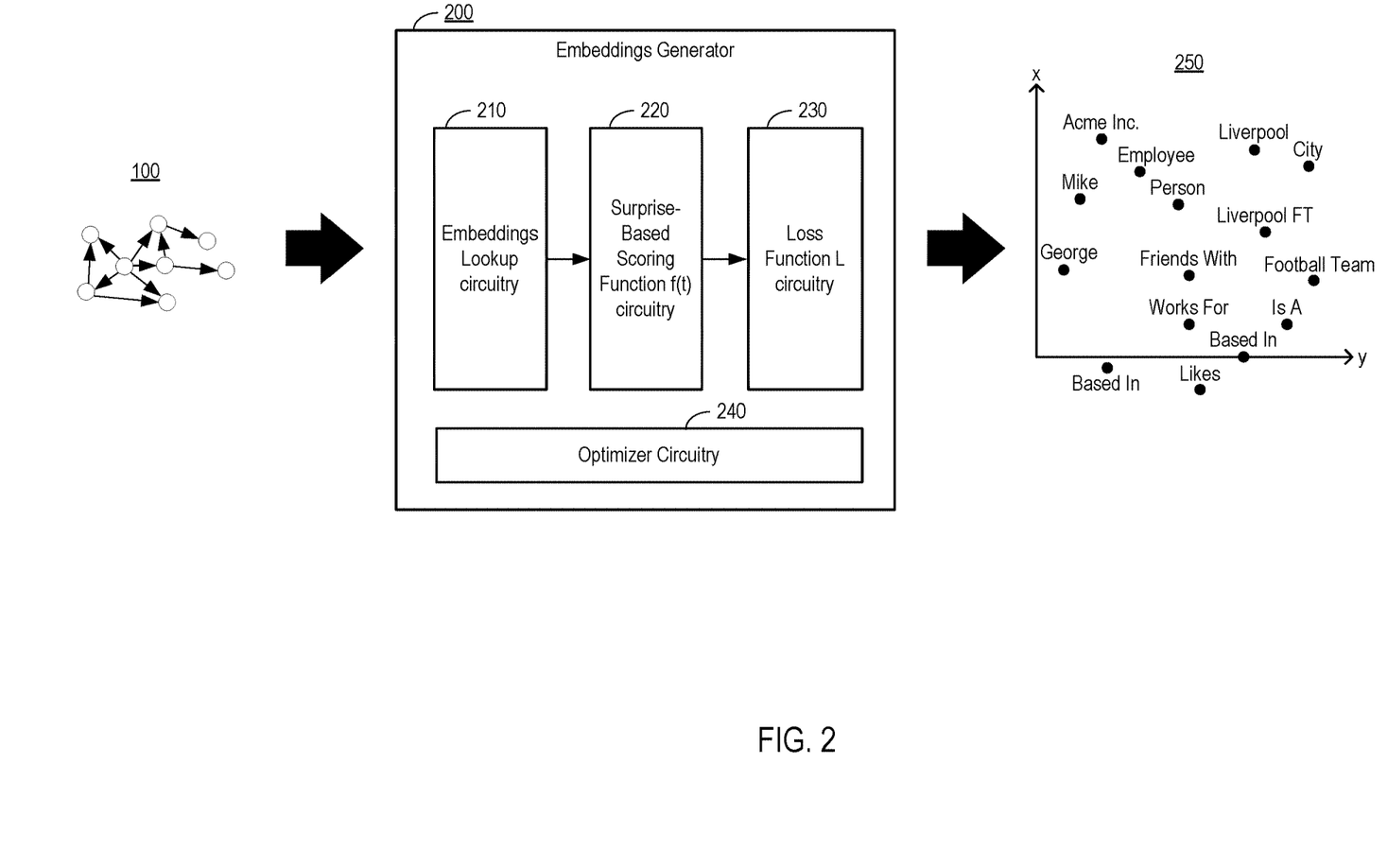
FIG. 2 shows an exemplary block diagram for an embeddings generator utilized during a training process, according to some embodiments.

FIG. 2 shows an exemplary block diagram of an embeddings generator 200 used for implementing a training process. The embeddings generator 200 includes an embeddings lookup circuitry 210, a surprise-based scoring function f(t) circuitry 220 ("surprise circuitry"), a loss function L circuitry 230, and an optimizer circuitry 240. Each circuitry described herein may be a sub-system comprised of software, hardware, middleware, application programming interface (API), or other components for implementing the corresponding features of the circuitry. Furthermore, a surprising fact generator modeling tool ("SFGM tool") may be executed to control the embeddings generator 200 to implement the features described herein. The SFGM tool may be a representation of a sub-system comprising software, hardware, middleware, application programming interface (API), or other components for implementing the corresponding features of the tool.

The embeddings generator 200 receives the KG 100 as an input. From the KG 100 input, the embeddings generator 200 outputs an embeddings space 250, where the embeddings space 250 includes point coordinates that represent each of the data points included in the KG 100 (e.g., nodes and/or edges from the KG 100). The embeddings space 250 is a metric space (e.g., Cartesian space) having one or more dimensions, and is a representation of a trained embeddings space that includes point coordinate representations of the knowledge graph 100 data that will be used to run further prediction analysis on, as described later with reference to at least the inference process described in FIG. 3. In this case, the KG 100 itself serves as the training dataset for training the embeddings generator 200.

The embeddings space 250 shown in FIG. 2 is depicted as having two dimensions. However, the embeddings generator 200 may create the embeddings space 250 to include additional dimensions. Within the embeddings space 250, are point coordinates that represent the data points from the KG 100. According to some embodiments, the embeddings space 250 may include point coordinates for some, or all, of the data included in the KG 100. By converting the KG 100 into the embeddings space 250, the resulting coordinate values are representative of the data from the KG 100 which may now be analyzed using algebraic algorithms to calculate the new surprising fact predictions.

The embeddings lookup circuitry 210 may include a lookup table storing a set of candidate coordinates that match up to each of the data points (node and/or edge included in the KG 100) that are considered for inclusion in the embeddings space 250. For example, the embeddings lookup circuitry 210 may comprise the following lookup table of candidate coordinates shown in Table 1 below:

TABLE 1

| {Mike}   | $(x_1, y_1)$ |
| {George} | $(x_2, y_2)$ |
| {Likes}  | $(x_3, y_3)$ |
| ...      | ...          |

It follows that each data point in the KG 100 considered for inclusion in the embeddings space 250 will be converted to a point coordinate in the embeddings space 250 according to a value obtained from the lookup table. So the embeddings space is comprised of points obtained from the direct lookup procedure. However, according to other embodiments the specific point coordinates may be obtained based on the utilization of a random selection generator.

So the SFGM tool may control the embeddings generator 200 to select candidate point coordinates for the data points in the KG 100 and run it through the surprise circuitry 220 to calculate an overall surprise score, where the overall surprise score is calculated according to the overall surprise score function f(t). The SFGM tool then runs the resulting overall surprise score through the loss function L circuitry 230. The loss function L applied by the loss function L circuitry 230 may be a known loss function L such as a pairwise loss function, a negative log likelihood loss function, or a self-adversarial loss function. The SFGM tool then applies the optimizer circuitry 240 on the resulting loss function L to optimize the loss function L. The optimizer circuitry 240 is executed to identify the best point coordinates in the embeddings space 250 for each data point in the KG 100 so that the loss function L results in the smallest loss.

In running the optimizer circuitry 240, the SFGM tool operates the embeddings generator 200 to learn a function that will result in the smallest loss, which reduces a "penalty". The less is known, the greater the penalty. The penalty itself is represented by an objective function (e.g., a Loss Function such as the Pairwise loss, Negative log-likelihood loss, or Multiclass negative log-likelihood loss). Such Loss functions embed the surprise-based scoring function. The SFGM tool iteratively runs through these steps for the data points in the KG 100 to train the embeddings generator 200 to identify the point coordinates that result in the smallest loss results. In this way, the SFGM tool operates as a ML model that receives the KG 100 as an input, and learns point coordinates in the metric space of the embeddings space 250 that match up to the data points of the KG 100. Later on, the SFGM tool then applies algebraic algorithms to the point coordinates in the embeddings space 250 to predict new and surprising facts derived from the data included in the KG 100.

Figure 3:
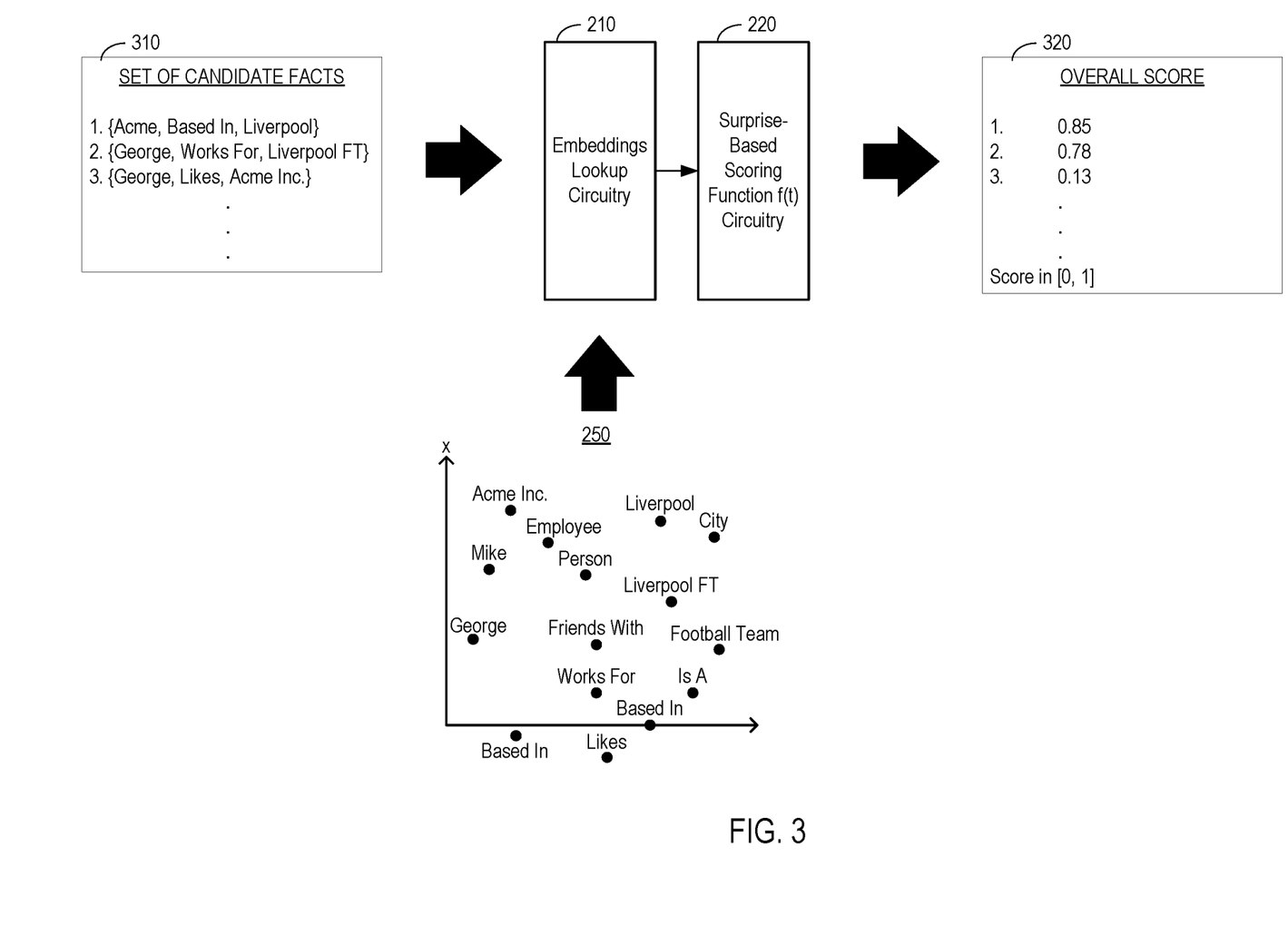
FIG. 3 shows an exemplary block diagram for a scoring circuitry utilized during an inference process, according to some embodiments.

After selecting the point coordinates to include in the embeddings space 250, the resulting embeddings space 250 is referenced to apply further inference analysis. The inference process shown in FIG. 3 is implemented by the SFGM tool in controlling the embeddings generator 200 to execute the inference process. As shown in FIG. 3, the embeddings space 250 is input to the embeddings lookup circuitry 210, and a set of candidate facts 310 is also input to the embeddings lookup circuitry 210. The information presented by the set of candidate facts 310 is based on the concepts and relationships included in the KG 100. However, the specific facts included in the set of candidate facts 310 may not be directly found in the linked data of the KG 100. It follows that the set of candidate facts 310 serves as collection of candidate facts that will be further analyzed and from which a new surprising fact will be selected from. So unlike the first training process where the embeddings generator 200 receives the KG 100 that is comprised of known and existing facts, during the second inference process the embeddings generator 200 receives the set of candidate facts 310 that may not include facts as they presently exist in the KG 100.

According to some embodiments, the set of candidate facts 310 may be created by a random generator that selects concepts and relationships existing in the KG 100, and combine them randomly into the candidate facts. According to some embodiments, the set of candidate facts 310 may be selected from a lookup table including a database of candidate facts, where a random selection generator selects a number of candidate facts from the database to be included in the set of candidate facts 310. The total number of candidate facts included in the set of candidate facts 310 input to the embeddings lookup circuitry 210 may be a predetermined number. According to some embodiments, the total number of candidate facts included in the set of candidate facts 310 input to the embeddings lookup circuitry 210 may be determined based on a separate analysis for promoting efficiency and calculations to conserve computing resources.

Table 2 below shows an exemplary set of candidate facts. As shown in Table 2, the candidate fact "Acme Based In Liverpool" is not directly found from the linked data of the KG 100, but is rather a candidate fact to be considered for selection as a new and surprising fact.

TABLE 2

{Acme, Based In, Liverpool}
{George, Works For, Liverpool FT}
{George, Likes, Acme Inc.}
...

Figure 4:
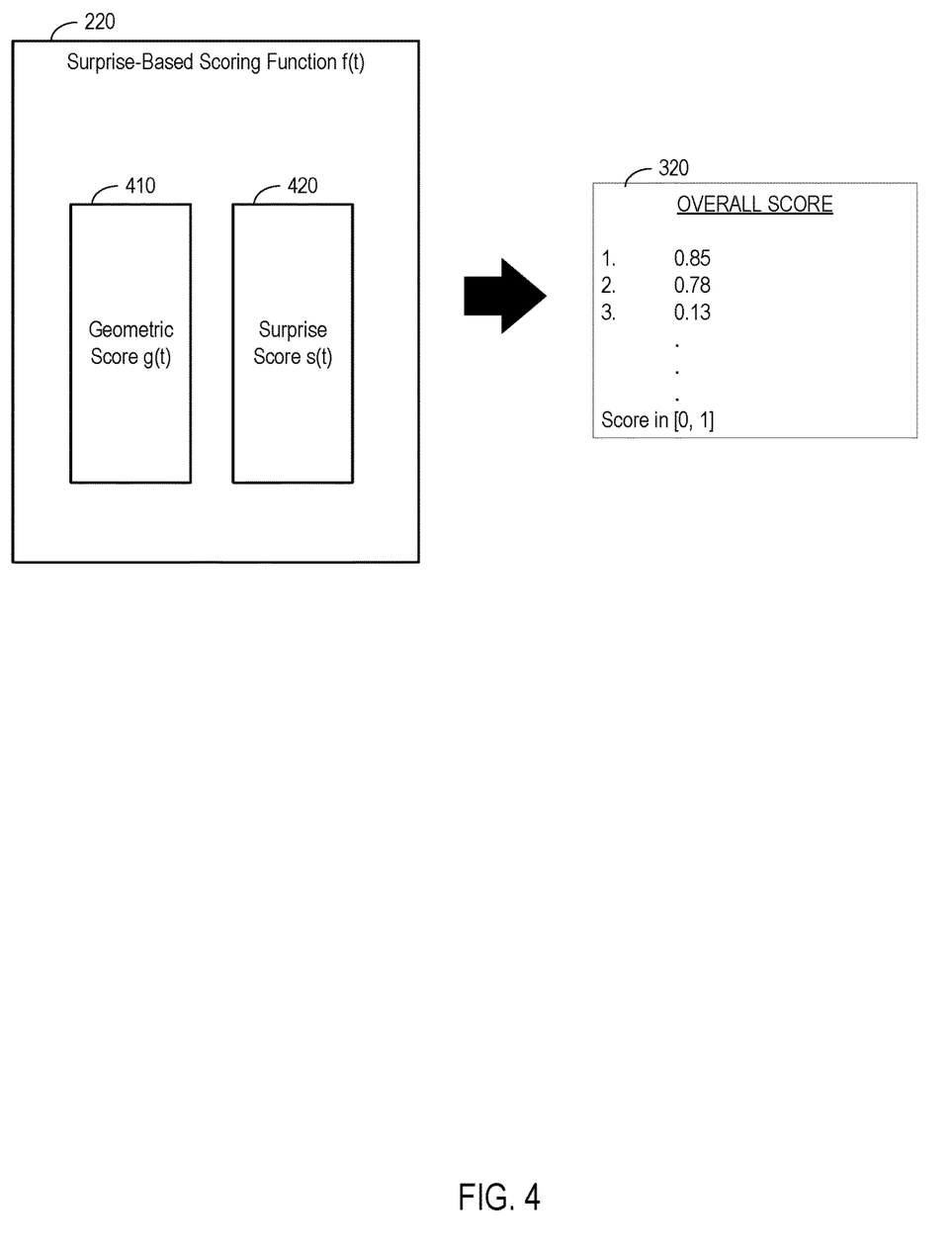
FIG. 4 shows an exemplary block diagram for a scoring circuitry utilized during an inference process that includes an exemplary geometric score function and an exemplary surprise score function, according to some embodiments.

With these two inputs to the embeddings lookup circuitry 210 as shown in FIG. 3, the embeddings lookup circuitry 210 transmits the set of candidate facts 310 to the surprise circuitry 220. The surprise circuitry 220 is configured to calculate an overall surprise score according to the overall surprise score function f(t) for one or more of the candidate facts included in the set of candidate facts 310. The resulting overall surprise scores 320 may be analyzed to select one or more of the candidate facts as a new surprising fact. FIG. 4 shows a more detailed view of the components included in the surprise circuitry 220.

As shown in FIG. 4, the overall surprise score function f(t) is comprised of a geometric score g(t) 410 component and a surprise score s(t) 420 component.

The geometric score g(t) 410 is calculated to determine whether a candidate fact may be interpreted as being true or false. So a high geometric score g(t) 410 is interpreted as being true, whereas a low geometric score g(t) 410 is interpreted as being false. Predetermined thresholds may be assigned, where a geometric score g(t) 410 value greater than a high score threshold is interpreted as being true, and a geometric score g(t) 410 value lower than a low score threshold is interpreted as being false.

It follows that the geometric score g(t) is a function configured to give high scores to facts that are predicted to be true according to a geometric interpretation of concepts/relationships in the embeddings space 250. The geometric score g(t) may be a known function such as complex embeddings (ComplEx), translating embeddings (TransE), or bilinear diagonal model (DistMult). The below is an example of the TransE function being used for the geometric score g(t):

$$g_{TransE}(t) = -\|s+r-o\|_2$$

The surprise score s(t) 420 is calculated to determine whether a candidate fact may be interpreted as being surprising. So a high surprise score s(t) 420 is interpreted as being surprising, whereas a low surprise score s(t) 420 is interpreted as being not surprising. Predetermined thresholds may be assigned, where a surprise score s(t) 420 value greater than a high score threshold is interpreted as being surprising, and a surprise score s(t) 420 value lower than a low score threshold is interpreted as being not surprising.

It follows that the surprise score s(t) is a function configured to compute how an average score computed on all the candidate fact triples with h as a subject, diverges from the score assigned to the candidate fact triple being currently predicted. An exemplary function to use for the surprise score s(t) is the Kullback-Leibler divergence function (KL) that can be applied to calculate a Bayesian surprise.

$$s(t) = KL[P(h), \delta g(t)]$$

$$= P(h) * \log\frac{P(h)}{\delta g(t)}$$

$$= E[\delta g(H)] * \log\frac{E[\delta g(H)]}{\delta g(t)}$$

Where:
KL: Kullback-Leibler divergence function
h: subject of fact t=(h, r, o)
g(t): geometric score of fact t
P(h): prior, $E[\{\delta g(t), \forall t \in H\}]$
H: $\{t=(h, \bullet, \bullet)\}$
E[•]: expectation, the average of •, where • is a set of probabilities
For example using the KG 100:

P(Liverpool FT)=$E[\delta[\{g$(Liverpool FT, Based in, Liverpool)$]+\delta[\{g$(Liverpool FT, Is A, Football Team)]]

So an average surprise score is calculated for each candidate fact including the same subject h. Then for each candidate fact including the subject h, a divergence from the average surprise score is calculated. Then the surprise score from the surprise score function s(t) for the specific candidate fact will correspond to its level of divergence from the average surprise score. Here, a larger divergence will result in the candidate fact being assigned a larger surprise score, and a smaller divergence will result in the candidate fact being assigned a smaller surprise score.

The overall surprise score function f(t) is calculated by taking the product of the geometric score g(t) 410 and the surprise score s(t) 420. The resulting overall surprise scores 320 correspond to each of the candidate facts that are considered from the set of candidate facts 310, where the candidate facts are applied through the overall surprise score function f(t) by the surprise circuitry 220. According to the embodiments described herein, a high overall surprise score is calculated for candidate facts that are predicted to be both true and a new surprising fact. Conversely, a low overall surprise score is calculated for candidate facts that are predicted to be both false and not a new surprising fact. Table 3 below represents a chart that may be used for interpreting the overall surprise scores 320:

TABLE 3

| f(t) | g(t) | s(t) |
|---|---|---|
| High | True | Surprising |
| Medium | True | Not Surprising |
| Medium | False | Surprising |
| Low | False | Not Surprising |

The overall surprise score may be represented as:

$f_{surprise}(t)=g(t)*s(t)$

To mathematically ensure the value of the overall surprise score remains a probability value between 0-1, more accurately the overall surprise score may be represented as:

$f_{surprise}(t)=\delta g(t)*\delta s(t)$

Where in both cases t=(s, p, o), and s is the subject, p is the predicate, and o is the object in the triple {s, p, o} representing the candidate fact. δ describes a function for converting a number to have a respective value between 0-1 to represent a probability between 0-100%.

Figure 5:
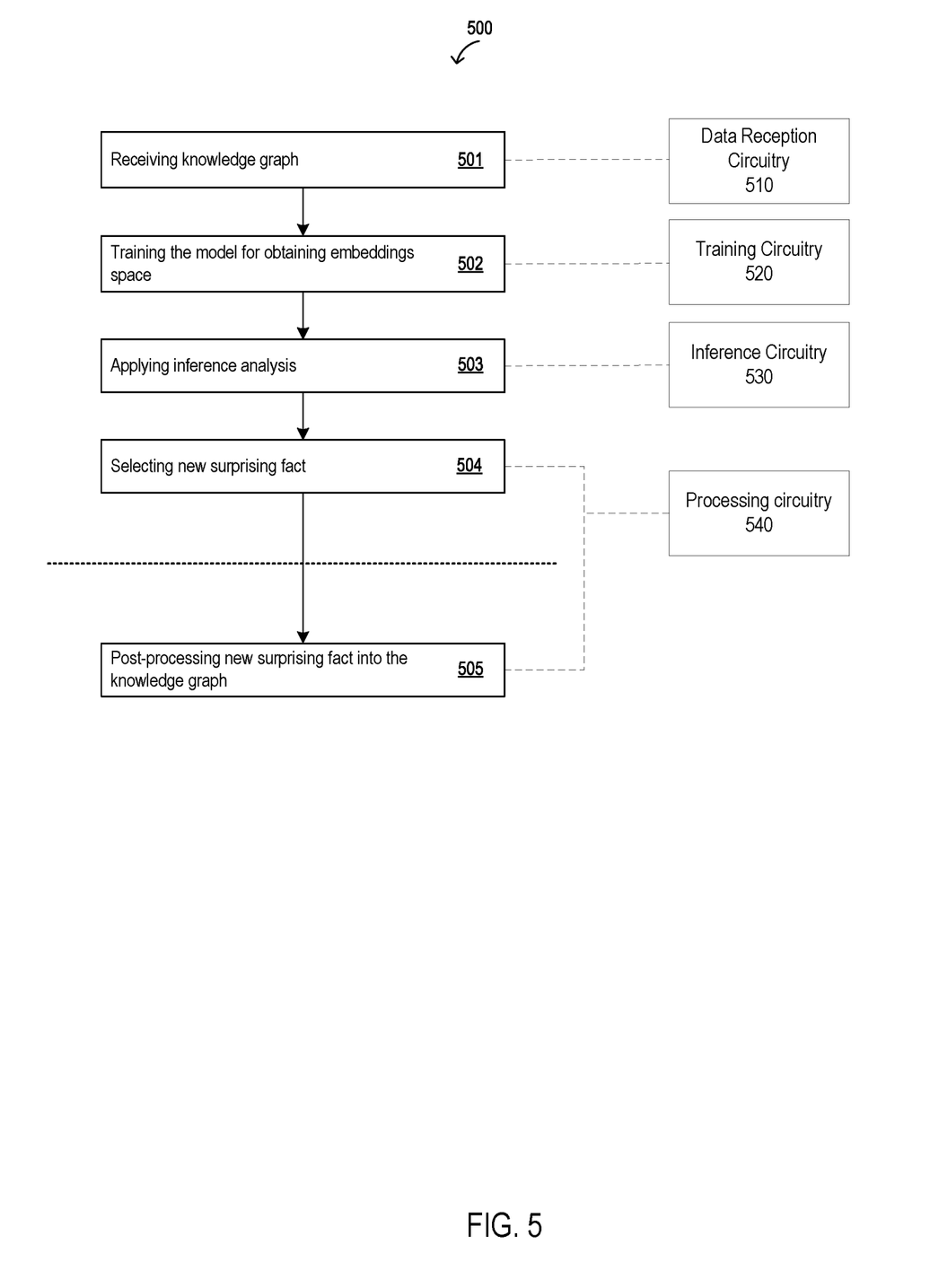
FIG. 5 shows an exemplary flow diagram describing a process for determining a surprising fact, according to some embodiments.

FIG. 5 shows an exemplary flow diagram 500 describing a process for determining a surprising fact. The features may be operated by, for example, the SFGM tool.

At 501, the SFGM tool controls data reception circuitry 510 to receive a knowledge graph, or at least a portion of a knowledge graph. The knowledge graph may include data arranged as shown by KG 100.

At 502, the SFGM tool controls training circuitry 520 to implement a training process to train machine learning models included in the embeddings lookup circuitry for obtaining an embeddings space. The training process may correspond to the training process described herein with reference to FIG. 2.

At 503, the SFGM tool controls inference circuitry 530 to apply an inference analysis process. The inference analysis process may correspond to the inference analysis process described herein with reference to FIG. 3. During the inference analysis process, a set of candidate facts will be further analyzed to determine each of their inferred level of truthfulness and level of surprise compared against other candidate facts in the set of candidate facts.

At 504, the SFGM tool controls processing circuitry 540 to select a new surprising fact from the set of candidate facts. The selection process may include selecting one or more candidate facts to be considered surprising facts. The selection criteria may include selecting a best scoring candidate fact, selecting a predetermined number of top scoring candidate facts, or selecting one or more candidate facts that have an overall surprise score greater than a threshold value. The surprising fact will not have previously been included in the linked data of the KG 100.

Following the selection of a surprising fact, at 505, the SFGM tool may control the processing circuitry 540 to insert the new surprising fact into the KG 100 according to some embodiments. As indicated in the flow diagram 500, the insertion process at 505 may be optional.

Figure 6:
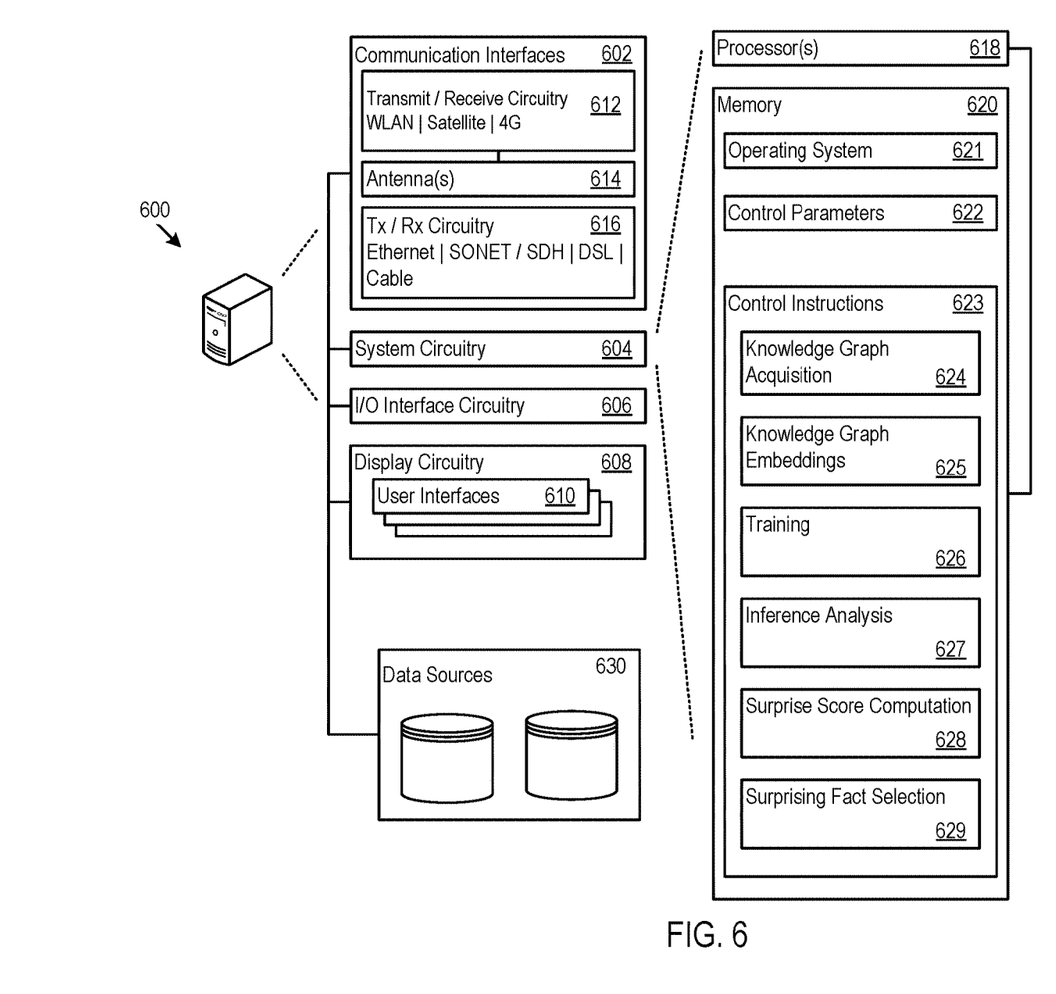
FIG. 6 shows an exemplary computer architecture for a computer device used to generate a surprising fact, according to some embodiments.

FIG. 6 illustrates an exemplary computer architecture of a computer device 600 on which features of the SFGM tool determining the surprising facts may be executed. The computer device 600 includes communication interfaces 602, system circuitry 604, input/output (I/O) interface circuitry 606, and display circuitry 608. The graphical user interfaces (GUIs) 610 displayed by the display circuitry 608 may be representative of GUIs generated by the SFGM tool to determine the surprising fact. The graphical user interfaces (GUIs) 610 displayed by the display circuitry 608 may also be representative of GUIs generated by the SFGM tool to receive knowledge graphs as inputs. The GUIs 610 may be displayed locally using the display circuitry 608, or for remote visualization, e.g., as HTML, JavaScript, audio, and video output for a web browser running on a local or remote machine. Among other interface features, the GUIs 610 may further render displays of any new knowledge graphs that have been supplemented with a new surprising fact determined by the SFGM tool as described herein.

The GUIs 610 and the I/O interface circuitry 606 may include touch sensitive displays, voice or facial recognition inputs, buttons, switches, speakers and other user interface elements. Additional examples of the I/O interface circuitry 606 includes microphones, video and still image cameras, headset and microphone input/output jacks, Universal Serial Bus (USB) connectors, memory card slots, and other types of inputs. The I/O interface circuitry 206 may further include magnetic or optical media interfaces (e.g., a CDROM or DVD drive), serial and parallel bus interfaces, and keyboard and mouse interfaces.

The communication interfaces 602 may include wireless transmitters and receivers ("transceivers") 612 and any antennas 614 used by the transmit and receive circuitry of the transceivers 612. The transceivers 612 and antennas 614 may support WiFi network communications, for instance, under any version of IEEE 802.11, e.g., 802.11n or 802.11ac, or other wireless protocols such as Bluetooth, Wi-Fi, WLAN, cellular (4G, LTE/A). The communication interfaces 602 may also include serial interfaces, such as universal serial bus (USB), serial ATA, IEEE 1394, lighting port, I²C, slimBus, or other serial interfaces. The communication interfaces 602 may also include wireline transceivers 616 to support wired communication protocols. The wireline transceivers 616 may provide physical layer interfaces for any of a wide range of communication protocols, such as any type of Ethernet, Gigabit Ethernet, optical networking protocols, data over cable service interface specification (DOCSIS), digital subscriber line (DSL), Synchronous Optical Network (SONET), or other protocol.

The system circuitry 604 may include any combination of hardware, software, firmware, APIs, and/or other circuitry. The system circuitry 604 may be implemented, for example, with one or more systems on a chip (SoC), application specific integrated circuits (ASIC), microprocessors, discrete analog and digital circuits, and other circuitry. The system circuitry 604 may implement any desired functionality of the SFGM tool. As just one example, the system circuitry 604 may include one or more instruction processor 618 and memory 620.

The memory 620 stores, for example, control instructions 623 for executing the features of the SFGM tool, as well as an operating system 621. In one implementation, the processor 618 executes the control instructions 623 and the operating system 621 to carry out any desired functionality for the SFGM tool, including those attributed to knowledge graph acquisition 624, knowledge graph embeddings 625, training 626, inference analysis 627, surprise score computation 628, and/or surprising fact selection 629. The control parameters 622 provide and specify configuration and operating options for the control instructions 623, operating system 621, and other functionality of the computer device 600.

The computer device 600 may further include various data sources 630. Each of the databases that are included in the data sources 630 may be accessed by the SFGM tool to obtain data for consideration during any one or more of the processes described herein. For example, KG 100 may be stored on a database that is part of the data sources 630, or enterprise data for generating the KG 100 may be stored on a database that is part of the data sources 630.

Various implementations have been specifically described. However, other implementations that include a fewer, or greater, number of features and/or components for each of the apparatuses, methods, or other embodiments described herein are also possible.

What is claimed is:

1. A computing device comprising:
a reception circuitry configured to receive a knowledge graph including a set of structured data;
a knowledge graph embedding circuitry configured to convert the knowledge graph to a trained embeddings space having multiple machine-learned dimensions, wherein the trained embeddings space includes a set of point coordinates representing the set of structured data in the trained embeddings space, and wherein the knowledge graph embedding circuitry is further configured to convert the knowledge graph by training an embeddings generator by iteratively running a set of point coordinates corresponding to data in the knowledge graph though an overall surprise score function, passing the overall surprise score through a loss function, applying the loss function through an optimizer, thereby identifying point coordinates that are inserted in the trained embedding space for each data point in the knowledge graph such that the loss function results in the smallest loss for each data point;
an inference circuitry configured to apply inference analysis on a set of candidate facts in the trained embeddings space by loading the set of point coordinates rather than the knowledge graph into a memory with reduced size; and
a processing circuitry configured to:
calculate a respective overall surprise score for each of a plurality of candidate facts included in the set of candidate facts in the trained embeddings space, where the respective overall surprise score is calculated according to a product of a geometric score function and a surprise score function, wherein a geometric score of the geometric score function is referenced to predict a truthfulness, and a surprise score of the surprise score function is referenced to predict a level of surprise;
select a candidate fact from the plurality of candidate facts as a predicted surprising fact based on an overall surprise score of the candidate fact in the trained embeddings space; and
insert the predicted surprising fact into the knowledge graph.

2. The computing device of claim 1, wherein each candidate fact included in the set of candidate facts is not included in the knowledge graph.

3. The computing device of claim 1, wherein the processing circuitry is configured to:
calculate an average geometric score for all candidate facts including a subject h;
calculate an initial geometric score for the candidate fact including the subject h;
determine a divergence of the average geometric score from the geometric score for the candidate fact; and
assign the divergence as the surprise score to the candidate fact that reflects the divergence.

4. The computing device of claim 1, wherein the processing circuitry is configured to select the candidate fact as the predicted surprising fact when the overall surprise score for the candidate fact is greater than a predetermined selection threshold.

5. The computing device of claim 1, wherein the processing circuitry is further configured to:
withhold selection of a second candidate fact as a second predicted surprising fact when the overall surprise score for the second candidate fact is less than a predetermined rejection threshold.

6. A method comprising:
receiving, by a reception circuitry, a knowledge graph including a set of structured data;
converting, by a knowledge graph embedding circuitry, the knowledge graph to a trained embeddings space having multiple machine-learned dimensions, wherein the trained embeddings space includes a set of point coordinates representing the set of structured data in the trained embeddings space, and wherein converting, by the knowledge graph embedding circuitry, the knowledge graph to a trained embeddings space having multiple machine-learned dimensions, further comprises training an embeddings generator by iteratively running point coordinates corresponding to data in the knowledge graph though an overall surprise score function, passing the overall surprise score through a loss function, applying the loss function through an optimizer, thereby identifying point coordinates that are inserted in the trained embedding space for each data point in the knowledge graph such that the loss function results in the smallest loss for each data point;

applying, by an inference circuitry, inference analysis on a set of candidate facts in the trained embeddings space by loading the set of point coordinates rather than the knowledge graph into a memory with reduced size;

calculating, by a processing circuitry, a respective overall surprise score for each of a plurality of candidate facts included in the set of candidate facts in the trained embeddings space, where calculating the respective overall surprise score comprises calculating a product of a geometric score function and a surprise score function, wherein a geometric score of the geometric score function is referenced to predict a truthfulness, and a surprise score of the surprise score function is referenced to predict a level of surprise;

selecting, by the processing circuitry, a candidate fact from the plurality of candidate facts as a predicted surprising fact based on an overall surprise score of the candidate fact in the trained embeddings space; and inserting, by the processing circuitry, the predicted surprising fact into the knowledge graph.

7. The method of claim 6, wherein each candidate fact included in the set of candidate facts is not included in the knowledge graph.

8. The method of claim 6, wherein calculating the surprise score for the candidate fact including a subject h comprises:
calculating an average geometric score for all candidate facts including the subject h;
calculating an initial geometric score for the candidate fact;
determining a divergence of the average geometric score from the geometric score for the candidate fact; and
assigning the divergence as the surprise score to the candidate fact that reflects the divergence.

9. The method of claim 6, wherein selecting the candidate fact as the predicted surprising fact comprises selecting the candidate fact as the predicted surprising fact when the overall surprise score for the candidate fact is greater than a predetermined selection threshold.

10. The method of claim 6, further comprising: withholding, by the processing circuitry, selection of a second candidate fact as a second predicted surprising fact when the overall surprise score for the second candidate fact is less than a predetermined rejection threshold.

11. A computing device comprising:
a processing circuitry; and
a non-transitory storage medium configured to store instructions that, when executed, causes the processing circuitry to:
receive a knowledge graph including a set of structured data;
convert the knowledge graph to a trained embeddings space having multiple machine-learned dimensions, wherein the trained embeddings space includes a set of point coordinates representing the set of structured data in the trained embeddings space, by training an embeddings generator by iteratively running point coordinates corresponding to data in the knowledge graph though an overall surprise score function, passing the overall surprise score through a loss function, applying the loss function through an optimizer, thereby identifying point coordinates that are inserted in the trained embedding space for each data point in the knowledge graph such that the loss function results in the smallest loss for each data point;

apply inference analysis on a set of candidate facts in the trained embeddings space by loading the set of point coordinates rather than the knowledge graph into a memory with reduced size;

calculate a respective overall surprise score for each of a plurality of candidate facts included in the set of candidate facts in the trained embeddings space, where the respective overall surprise score is calculated according to a product of a geometric score function and a surprise score function, wherein a geometric score of the geometric score function is referenced to predict a truthfulness, and a surprise score of the surprise score function is referenced to predict a level of surprise;

select a candidate fact from the plurality of candidate facts as a predicted surprising fact based on an overall surprise score of the candidate fact in the trained embeddings space; and insert the predicted surprising fact into the knowledge graph.

12. The computing device of claim 11, wherein each candidate fact included in the set of candidate facts is not included in the knowledge graph.

13. The computing device of claim 11, wherein the instructions, when executed, causes the processing circuitry to:
calculate an average geometric score for all candidate facts including a subject h;
calculate an initial geometric score for the candidate fact including the subject h;
determine a divergence of the average geometric score from the geometric score for the candidate fact; and
assign the divergence as the surprise score to the candidate fact that reflects the divergence.

14. The computer device of claim 11, wherein the instructions, when executed, causes the processing circuitry to select the candidate fact as the predicted surprising fact when the overall surprise score for the candidate fact is greater than a predetermined selection threshold.

15. The computing device of claim 11, wherein the instructions, when executed, further causes the processing circuitry to:
withhold selection of a second candidate fact as a second predicted surprising fact when the overall surprise score for the second candidate fact is less than a predetermined rejection threshold.

* * * * *

UNITED STATES PATENT AND TRADEMARK OFFICE
CERTIFICATE OF CORRECTION

| | |
|---|---|
| PATENT NO. | : 12,051,010 B2 |
| APPLICATION NO. | : 16/560499 |
| DATED | : July 30, 2024 |
| INVENTOR(S) | : Luca Costabello et al. |

Page 1 of 1

It is certified that error appears in the above-identified patent and that said Letters Patent is hereby corrected as shown below:

In the Claims

- In Claim 1, Column 9, Line 61, delete "though" and insert -- through -- between "graph" and "an overall";

- In Claim 6, Column 10, Line 61, delete "though" and insert -- through -- between "graph" and "an overall";

- In Claim 11, Column 12, Line 1, delete "though" and insert -- through -- between "graph" and "an overall".

Signed and Sealed this
Tenth Day of December, 2024

Katherine Kelly Vidal
*Director of the United States Patent and Trademark Office*